(12) United States Patent
Arnborg

(10) Patent No.: US 6,205,018 B1
(45) Date of Patent: Mar. 20, 2001

(54) AIR INSULATED SWITCHGEAR WITH OPERATING DEVICE FOR EFFECT CIRCUIT BREAKER

(75) Inventor: Christer Arnborg, Gavle (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 08/875,571

(22) PCT Filed: Jan. 26, 1996

(86) PCT No.: PCT/SE96/00088

§ 371 Date: Nov. 17, 1997

§ 102(e) Date: Nov. 17, 1997

(87) PCT Pub. No.: WO96/23336

PCT Pub. Date: Aug. 1, 1996

(30) Foreign Application Priority Data

Jan. 26, 1995 (SE) .................................. 9500293

(51) Int. Cl.$^7$ ...................................... H02B 1/04
(52) U.S. Cl. ............... 361/609; 200/332.1; 218/120; 218/154; 361/618
(58) Field of Search ............... 200/330, 332.1; 218/118–120, 140, 153, 154; 361/605–609, 614, 615, 618

(56) References Cited

U.S. PATENT DOCUMENTS

| | | |
|---|---|---|
| 3,597,556 | 8/1971 | Sharp . |
| 4,214,291 * | 7/1980 | Koshman . |
| 4,384,179 * | 5/1983 | Milianowicz . |
| 4,550,234 | 10/1985 | Steinemer . |
| 4,593,165 * | 6/1986 | Steinemer . |
| 5,354,959 | 10/1994 | Yoshizumi et al. . |
| 5,450,280 * | 9/1995 | Wactor . |

FOREIGN PATENT DOCUMENTS

| | | | |
|---|---|---|---|
| 1233455 * | 2/1967 | (DE) | ..................................... 200/330 |
| 2049736 | 9/1972 | (DE) | . |
| 2337135 * | 2/1974 | (DE) | ..................................... 200/330 |
| 0279045 | 8/1988 | (EP) | . |
| 2044003 * | 1/1980 | (GB) | ..................................... 200/330 |

* cited by examiner

Primary Examiner—Gerald Tolin
(74) Attorney, Agent, or Firm—Hodgson Russ LLP

(57) ABSTRACT

With the intention of simplifying the replacement of an operating device (4) of an air insulated switchgear (1) having a power circuit breaker (3), the operating device has been made dockable. By dockable is meant that the operating device can be readily removed from and replaced on the circuit breaker, i.e. can be separated from and connected to the circuit breaker without needing to influence the function thereof. This has been made possible by providing the operating device with guide parts, such as a splined, rotatable outward shaft, and by providing the switchgear with guide parts which correspond to and receive the guide parts on said shaft, for instance a splined hole provided in a shaft for operating the circuit breaker and receiving and cooperating with the splined shaft. In modern switchgear, the operating device is damaged more often than the circuit breaker, and a dockable operating device enables the device to be removed readily without affecting the circuit breaker function.

7 Claims, 1 Drawing Sheet

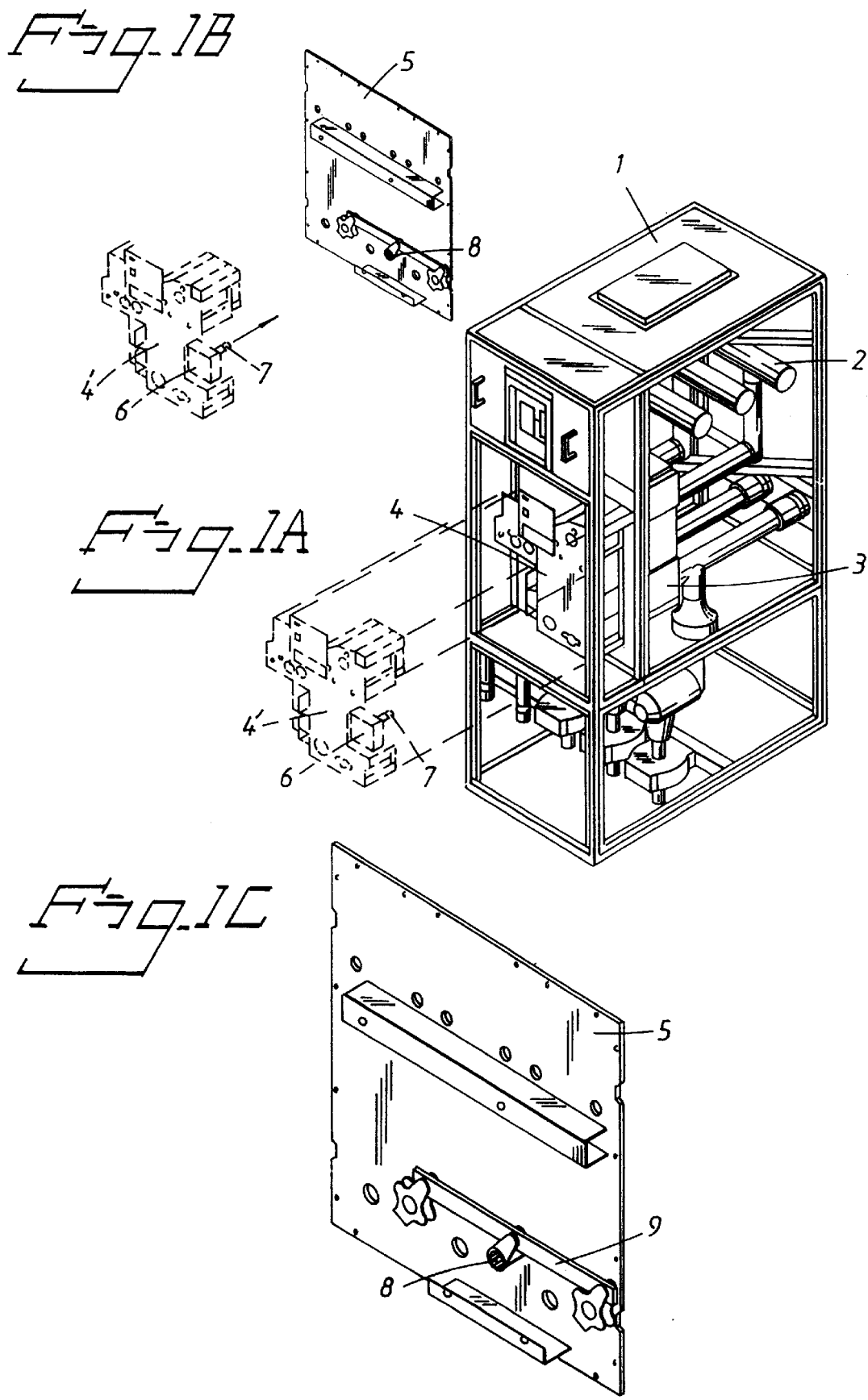

AIR INSULATED SWITCHGEAR WITH OPERATING DEVICE FOR EFFECT CIRCUIT BREAKER

TECHNICAL FIELD

The present invention relates to air insulated switchgear (AIS) provided with a device for operating one or more power circuit breakers in the switchgear.

DESCRIPTION OF THE BACKGROUND ART

Switchgear for high voltages/current strengths will most often include one or more operating devices and one or more circuit breakers each connected to busbars. The operating devices for operating the circuit breakers are connected to the switchgear and must be dimensioned to manage the maximum load when the current supply is broken. To this end, each operating device is provided with a very powerful spring or with powerful mutually coacting springs, wherein the spring force/spring forces have been dimensioned to manage this seldomly occurring maximum load. It is necessary to adapt the mechanical structural components of the operating device to the largest active spring and circuit-breaking forces, so as to prevent damage to the operating device. The operating device in also subjected to high stresses even when making or breaking a current circuit in the absence of a maximum load, since large spring forces must be balanced in the operating device, these stresses being liable to result in damage to the mechanical components. A damaged operating device must either be replaced or repaired. In such cases, it is necessary to manoeuver a circuit breaker (fixedly) connected to the operating device to an off-position and take the circuit breaker out of operation, meaning that the current supply must either be switched off or rearranged. If the circuit breaker cannot be manoeuvered to an off position, it is necessary to open a parent circuit breaker, which entails still greater disturbance in operation.

SUMMARY OF THE INVENTION

With the intention of simplifying the replacement of an operating device in an air insulated switchgear having power circuit breakers, the operating device has been made separable to the circuit breaker and capable of being docked thereto. By a dockable operating device is meant an operating device which an be readily removed from and fitted onto the power circuit breaker, i.e. be removable and connectable without needing to influence the circuit breaking function. This is achieved without loosening links, which has been made possible by providing the operating device with guide parts, such as an outgoing, rotatable splined shaft, and by providing the switchgear with corresponding guide parts adapted for coaction with the first-mentioned guide parts, for instance a receiving splined hole in a circuit breaker operating shaft, said splined hole being adapted to receive the splined shaft. For reasons of personal safety, it is essential that this can be effected without access to the high voltage parts of the switchgear. This is made possible by placing the manoeuvering device in a space separated from said parts. In earlier designs, it was the power circuit breakers in switchgear that were most likely to suffer damage, therewith necessitating a replacement of the damaged circuit breakers. In the case of modern-day switchgear, it is more often the operating device that suffers damage rather than the circuit breakers. An operating device that can be readily docked onto the switchgear enables the operating device to be easily replaced without affecting the circuit breaker function.

BRIEF DESCRIPTION OF THE DRAWING

FIG. 1A is a simplified illustration of an air insulated switchgear provided with a dockable operating device in accordance with the invention.

FIG. 1B illustrates in detail the operating device of FIG. 1 when removed from the switchgear, and also shows a free circuit breaker wall.

FIG. 1C is an enlarged view of the circuit breaker wall shown in FIG. 1B.

DESCRIPTION OF AN EXEMPLIFYING EMBODIMENT

FIG. 1A is a simplified illustration of an air insulated switchgear 1 for high voltages a $\geq$ 1 kV, with several protective plates omitted in order to enable units mounted in the switchgear to be seen. Mounted in the rear part of the switchgear is a busbar system comprising a plurality of tubular busbars 2 having connections to circuit breaker contacts in the power circuit breakers 3 of the switchgear. The dockable operating device 4 has the form of an independent unit, which is shown connected/docked to the circuit breakers. The space required to move the dockable operating device from its position in connection with the circuit breakers of the switchgear to a position outwardly of said circuit breakers is shown in broken lines, which also indicate the positioning of the removed operating device 4'. FIG. 1B is a detailed illustration of the operating device separated from a circuit breaker wall 5 in the switchgear. FIG. 1C is an enlarged view of the free circuit breaker wall 5. The internal construction of the dockable operating device is considered to be earlier known and will not therefore be described here. It suffices to mention that the operating device includes a drive part 6 having a splined output operating shaft 7 on the rear side of the device. When the operating device 4 is docked, this outward shaft is inserted into engagement with a splined axially extending hole 8 in a shaft which may be connected to a connecting rod 9 for manoeuvering or operating the circuit breaker/circuit breakers. If a fault occurs in the operating device, all that need be done is to undock the device while allowing the power circuit breaker/breakers to remain seated in the switchgear without affecting the function of said breaker/breakers. With power breakers that are fixedly mounted inwardly of the high voltage encapsulation of the switchgear, the dockable operating device provides a satisfactory solution from the aspect of safety with regard to electrical hazards, since the device can be replaced without risk of coming into contact with a live conductor, by virtue of fitting the operating device externally of the high voltage encapsulation for primary current paths in the switchgear.

The fault frequency is greater with regard to operating devices than with regard to power circuit breakers, and a dockable operating device can be remedied more simply by replacing the operating device without interferring with the circuit breaker function.

The dockable operating device may also be provided with further guide means adapted to fit corresponding guides in the switchgear. For instance, the switchgear may be provided with guide rails and the operating device with wheels which enable the device to be moved easily along the guide rails when docking the device.

What is claimed is:

1. Air insulated switchgear having an operating device for operating one or more high voltage power circuit breakers of the switchgear, characterized in that the operating device (4) is a dockable unit of the switchgear and separable while the circuit breaker is connected, said operating device and said switchgear having co-operating and interfitting guide structures (7, 8) so that said operating device can be removed from and fitted onto the circuit breaker without affecting functioning of the circuit breaker.

2. Switchgear according to claim 1, including high voltage encapsulation for primary current paths of the switchgear, and characterized in that the operating device (4) is disposed outwardly of the high voltage encapsulation for primary current paths of the switchgear; and in that the circuit breaker/breakers (3) is/are disposed inwardly of said high voltage encapsulation.

3. Switchgear according to claim 1, characterized in that the operating device (4) is a dockable independent unit, wherein said operating device can be docked with or undocked from the switchgear circuit breaker or breakers (3) without needing to influence the circuit breaker function and without loosening links.

4. Switchgear according to claim 2, characterized in that the operating device (4) is a dockable independent unit, wherein said operating device can be docked with or undocked from the switchgear circuit breaker or breakers (3) without needing to influence the circuit breaker function and without loosening links.

5. Switchgear according to claim 1, characterized in that the operating device includes an operating shaft (7) for operating one or more circuit breakers (3), wherein the shaft (7) is provided with splines which fit into a splined hole (8) on an operating mechanism for the circuit breaker function.

6. Switchgear according to claim 1, wherein the operating device includes an operating shaft (7) for operating one or more circuit breakers (3), and characterized in that the operating shaft (7) on the operating device (4) is adapted to fit into a splined hole (8) in a shaft connected with a coupling rod (9) for operating the circuit breaker function.

7. Switchgear according to claim 1, characterized in that the operating device (4) is provided with guide means which enable the device to be docked/connected to circuit breakers fixedly mounted in the switchgear.

* * * * *